United States Patent
Iwami

(10) Patent No.: US 9,891,657 B2
(45) Date of Patent: Feb. 13, 2018

(54) ELECTROCONDUCTIVE FILM, AND TOUCH PANEL AND DISPLAY DEVICE PROVIDED WITH SAME

(71) Applicant: FUJIFILM Corporation, Tokyo (JP)

(72) Inventor: Kazuchika Iwami, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 262 days.

(21) Appl. No.: 14/667,955

(22) Filed: Mar. 25, 2015

(65) Prior Publication Data
US 2015/0198972 A1 Jul. 16, 2015

Related U.S. Application Data

(63) Continuation of application No. PCT/JP2013/075641, filed on Sep. 24, 2013.

(30) Foreign Application Priority Data

Sep. 27, 2012 (JP) ................................ 2012-215262

(51) Int. Cl.
*G06F 1/16* (2006.01)
*G06F 3/041* (2006.01)
(Continued)

(52) U.S. Cl.
CPC ............ *G06F 1/16* (2013.01); *G06F 3/041* (2013.01); *G06F 3/0412* (2013.01); *G06F 3/044* (2013.01);
(Continued)

(58) Field of Classification Search
CPC .......... G06F 1/16; G06F 3/041; G06F 3/0412; G06F 3/044; G06F 3/045; G06F 2203/04112
See application file for complete search history.

(56) References Cited

U.S. PATENT DOCUMENTS

2003/0067448 A1* 4/2003 Park ..................... G06F 3/0414
345/173
2010/0053112 A1* 3/2010 Chen ................... G02F 1/13394
345/174
(Continued)

FOREIGN PATENT DOCUMENTS

CN 101719037 A 6/2010
JP 2009-117683 A 5/2009
(Continued)

OTHER PUBLICATIONS

English Translation of the International Preliminary Report on Patentability in PCT Application No. PCT/JP2013/075641 dated Jan. 7, 2014.
(Continued)

*Primary Examiner* — Sejoon Ahn
(74) *Attorney, Agent, or Firm* — McGinn IP Law Group, PLLC

(57) ABSTRACT

An electroconductive film is provided on a display unit and has at least two wiring layers that are disposed on both sides of a transparent substrate or each disposed on either side of each of the at least two transparent substrates in a laminate form and are regularly arranged. A wiring pattern of the wiring layers is superimposed onto a pixel array pattern of the display unit, the wiring pattern of a lower layer being displaced in phase in relation to an upper layer. The electroconductive film satisfies: $fm1 \leq fm2$, when a first lowest frequency ($fm1$) is the lowest frequency of the moire spatial frequency, and a second lowest frequency ($fm2$) is the lowest frequency of the moire spatial frequency.

5 Claims, 12 Drawing Sheets

(51) Int. Cl.
G06F 3/044 (2006.01)
G06F 3/045 (2006.01)

(52) U.S. Cl.
CPC .... *G06F 3/045* (2013.01); *G06F 2203/04112* (2013.01)

(56) References Cited

U.S. PATENT DOCUMENTS

| | | | | |
|---|---|---|---|---|
| 2010/0128000 | A1* | 5/2010 | Lo | G06F 3/044 345/174 |
| 2010/0164884 | A1* | 7/2010 | Chiu | G06F 3/044 345/173 |
| 2011/0037713 | A1* | 2/2011 | Chen | G06F 3/041 345/173 |
| 2012/0242606 | A1* | 9/2012 | Mackey | G06F 3/044 345/173 |

FOREIGN PATENT DOCUMENTS

| | | |
|---|---|---|
| JP | 2011-237839 A | 11/2011 |
| TW | 201234140 A | 8/2012 |
| TW | 201237702 A | 9/2012 |

OTHER PUBLICATIONS

International Search Report (ISR) (PCT Form PCT/ISA/210), in PCT/JP2013/075641, dated Jan. 7, 2014.
Taiwanese Office Action dated Nov. 29, 2016 with an English translation thereof.

\* cited by examiner

FIG. 1
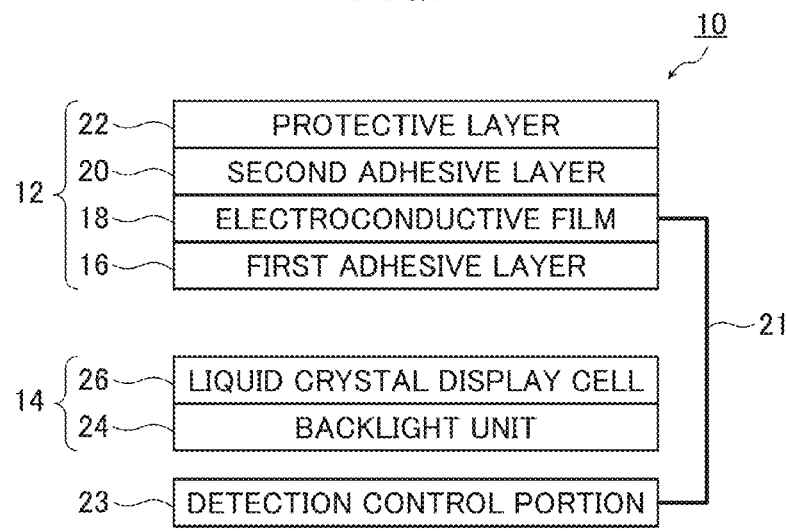
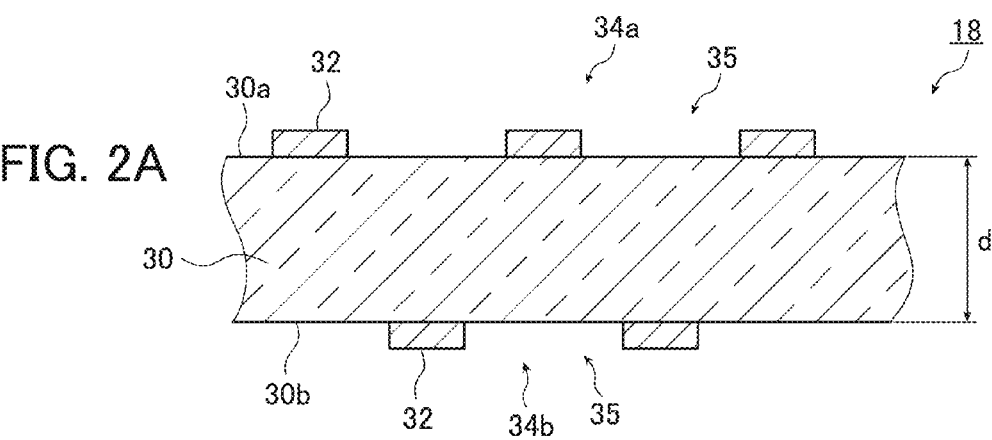
FIG. 2A
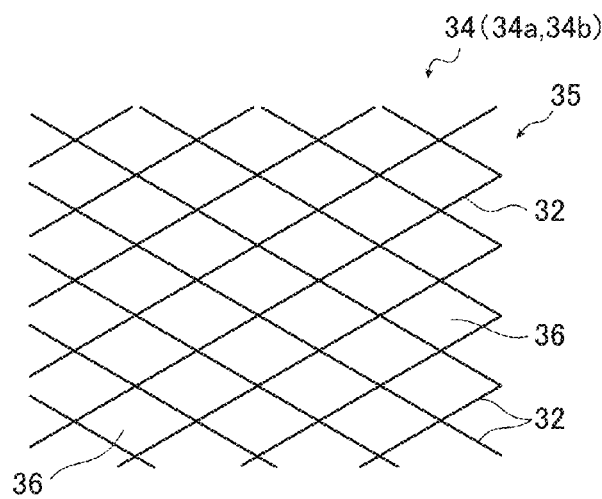
FIG. 2B

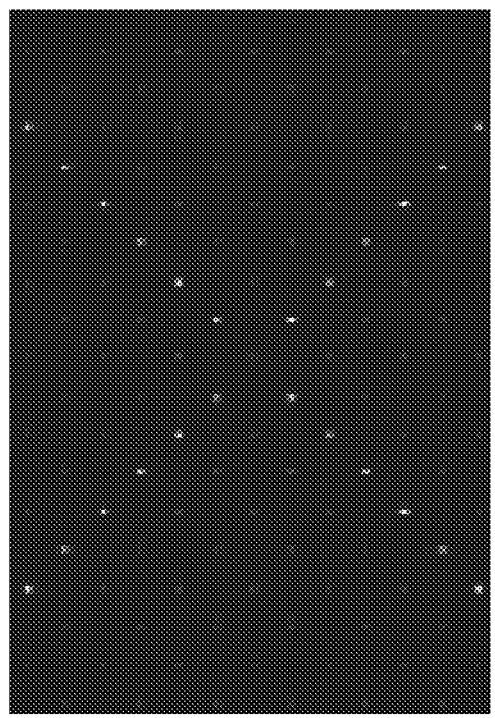
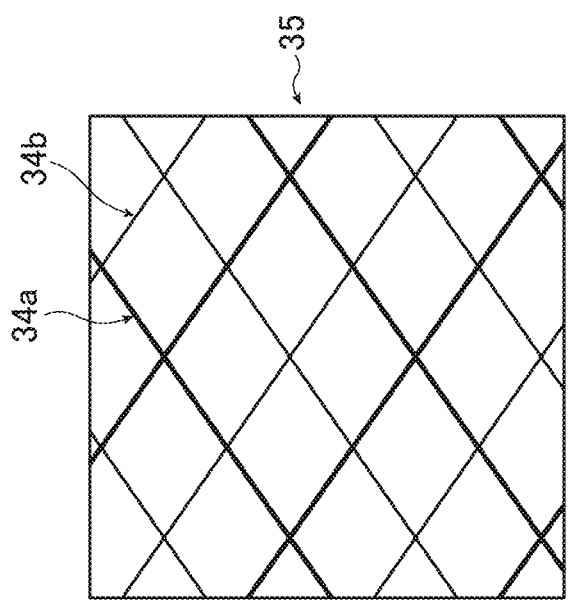

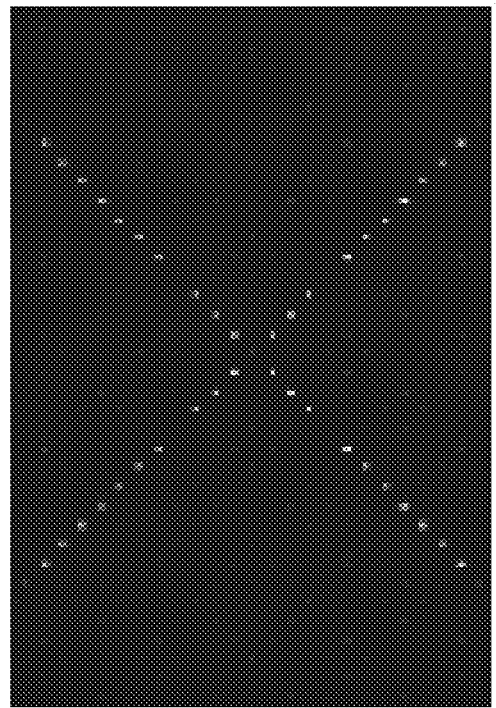
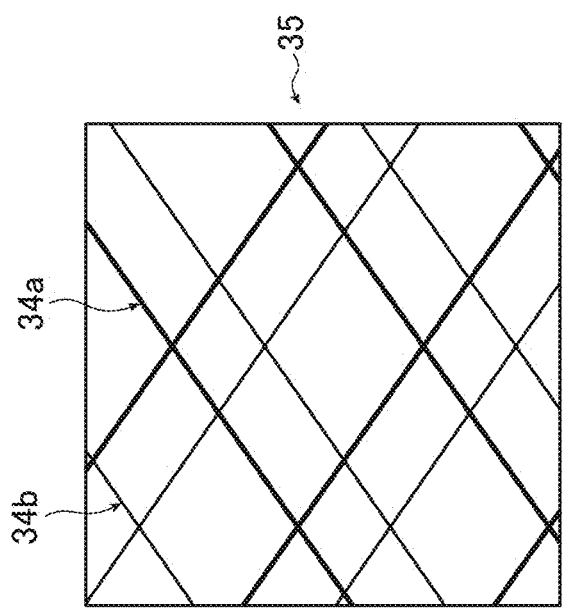

ELECTROCONDUCTIVE FILM, AND TOUCH PANEL AND DISPLAY DEVICE PROVIDED WITH SAME

CROSS-REFERENCE TO RELATED APPLICATIONS

This application is a Continuation of PCT International Application No. PCT/JP2013/075641 filed on Sep. 24, 2013, which claims priority under 35 U.S.C. § 119(a) to Japanese Application No. 2012-215262 filed on Sep. 27, 2012. Each of the above application(s) is hereby expressly incorporated by reference, in its entirety, into the present application.

BACKGROUND OF THE INVENTION

The present invention relates to an electroconductive film used for touch sensors, touch panels, and the like and relates to a touch panel and a display device which are provided with the electroconductive film. In particular, the present invention relates to an electroconductive film in which the occurrence of moire is reduced regardless of the viewing angle (observation angle) and relates to a touch panel and a display device which are provided with the electroconductive film.

Examples of an electroconductive film installed on a display unit of a display device (hereinafter, also referred to as a "display") include electroconductive films for electromagnetic wave shields, electroconductive films for touch panels, and the like (for example, see JP 2009-117683 A and JP 2011-237839 A).

JP 2009-117683 A discloses a technique that provides a wiring pattern having excellent visibility by controlling moire frequencies based only on frequency information on a black matrix pattern and a wiring pattern of a display in forming a wiring pattern of an electromagnetic wave shielding film.

Specifically, JP 2009-117683 A discloses that a second pattern, which is generated from second pattern data in which the relative distance between spectrum peaks of two-dimensional Fourier spectra (2DFFTSp) of the respective pattern data of a first pattern such as a pixel array pattern (for example, a black matrix (hereinafter, also referred to as "BM") pattern) of a display and the second pattern such as an electromagnetic wave shielding pattern exceeds a predetermined spatial frequency, for example, 8 cm$^{-1}$, is automatically selected. JP 2009-117683 A also discloses that when the aforementioned relative distance does not exceed the predetermined spatial frequency, the operation of generating new second pattern data by changing one or more of the rotation angle, the pitch, and the pattern width of the second pattern data is repeated until the aforementioned relative distance exceeds the predetermined spatial frequency.

In this way, according to JP 2009-117683 A, it is possible to automatically select an electromagnetic wave shielding pattern that can inhibit the occurrence of moire, and that can also prevent an increase in surface resistivity and deterioration of transparency.

An electroconductive sheet for a touch panel in JP 2011-237839 A has first electroconductive portions which are formed on the main surface at one side of a substrate and second electroconductive portions which are formed on the main surface at the other side of the substrate. The first electroconductive portions extend in a first direction, are arrayed in a second direction orthogonal to the first direction, and have two or more first transparent electroconductive patterns. The second electroconductive portions extend in the second direction, are arrayed in the first direction, and have two or more second transparent electroconductive patterns. When viewed from above, the first transparent electroconductive patterns and the second transparent electroconductive patterns are arranged to cross each other and deviate in directions different from the first direction and the second direction. In this way, according to JP 2011-237839 A, a plurality of spatial frequencies are combined with each other. As a result, the interference with the pixel array of a liquid crystal display device is inhibited, and the occurrence of moire is effectively reduced.

SUMMARY OF THE INVENTION

JP 2009-117683 A is for shielding electromagnetic waves, and in this document, the electromagnetic wave shielding pattern is formed at only one layer. Meanwhile, if the electromagnetic wave shielding pattern is formed at two or more layers, both of the reduction of moire which is visually recognized when the pattern is observed from the front and the reduction of moire when the viewing angle is changed need to be considered.

However, because JP 2009-117683 A relates to a technique of optimizing moire for only one layer, this cannot be applied to a touch panel or the like in which wiring is present at a plurality of layers.

Moreover, although JP 2011-237839 A considers the moire of a transparent electroconductive pattern having a double-layered structure, it does not at all consider the moire occurring when the viewing angle is changed.

As described above, in the current circumstances, regarding a touch panel or the like in which a wiring pattern is present at a plurality of layers, there is no technique that considers the occurrence of moire caused by change of the viewing angle and the reduction of the occurrence of moire.

An object of the present invention is to provide an electroconductive film which can reduce the occurrence of moire regardless of the viewing angle (observation angle) and particularly, even when being superimposed on a display unit such as a display panel, can lead to excellent visibility, as well as a touch panel and a display device provided with the electroconductive film.

In order to attain the objects described above, the present invention provides as its first aspect an electroconductive film installed on a display unit of a display device, comprising: one or two or more transparent substrates; and two or more wiring layers that are formed on both surfaces of the one transparent substrate or are each formed on one surface of each of the two or more transparent substrates, are disposed in a form of a laminate, and are regularly arranged, wherein wiring patterns of the two or more wiring layers are superimposed on a pixel array pattern of the display unit, and a wiring pattern of a wiring layer as a lower layer is disposed at a displaced position in phase relative to a wiring pattern of a wiring layer as an upper layer, and wherein the electroconductive film satisfies: fm1≤fm2, provided that among spatial frequencies of moire as obtained by convolution of spatial frequency characteristics of the wiring patterns of the two or more wiring layers and spatial frequency characteristics of the pixel array pattern of the display unit, a lowest frequency is set to a first lowest frequency fm1, and among spatial frequencies of moire as obtained by convolution of spatial frequency characteristics of a half of the wiring patterns of the two or more wiring layers and the spatial frequency characteristics of the pixel array pattern of the display unit, a lowest frequency is set to a second lowest frequency fm2.

Preferably, the spatial frequency characteristics of the wiring patterns of the two or more wiring layers are spatial frequency characteristics in a direction perpendicular to the one or two or more transparent substrates, and the spatial frequency characteristics of a half of the wiring patterns of the two or more wiring layers are spatial frequency characteristics in a direction inclined by a predetermined angle with respect to the one or two or more transparent substrates.

Preferably, the two or more wiring layers are formed on both surfaces of the one transparent substrate.

Preferably, the two or more transparent substrates are laminated on each other, the two or more wiring layers being each formed on one surface of each of the two or more transparent substrates.

Preferably, the two or more wiring layers each have a wiring pattern in a form of mesh in which a plurality of openings are arranged.

Preferably, the pixel array pattern is a black matrix pattern of the display unit.

In order to attain the objects described above, the present invention provides as its second aspect a touch panel, comprising: the electroconductive film of the first aspect of the invention; and a detection control portion configured to detect, within a region where the two or more wiring layers are formed, a position at which an object makes a contact with the electroconductive film from outside.

In order to attain the objects described above, the present invention provides as its third aspect a display device, comprising: a display unit; and the electroconductive film of the first aspect of the invention installed on the display unit.

In order to attain the objects described above, the present invention provides as its fourth aspect a display device, comprising: a display unit; and the touch panel of the second aspect of the invention installed on the display unit.

According to the present invention, it is possible to reduce moire not only in the case of observing a display from the front but also in the case of changing the viewing angle, regardless of the viewing angle. In particular, according to the present invention, it is possible to provide an electroconductive film which can lead to the improvement in visibility and exhibit excellent visibility even when being superimposed on a display unit such as a display panel, as well as a touch panel and a display device provided with the electroconductive film.

Consequently, the image quality of the touch panel and the display device provided with the electroconductive film of the present invention can be further improved.

BRIEF DESCRIPTION OF THE DRAWINGS

FIG. 1 is a schematic view showing an example of a display device according to an embodiment of the present invention.

FIG. 2A is a schematic cross-sectional view showing an example of an electroconductive film of the embodiment of the present invention, and FIG. 2B is a schematic view showing an example of a wiring pattern of the electroconductive film of the embodiment of the present invention.

FIG. 7A is a schematic view showing a wiring pattern formed when a viewing angle is 0°, and FIG. 7B is a view showing spatial frequency characteristics of the wiring pattern shown in FIG. 7A.

FIG. 8A is a schematic view showing a wiring pattern formed when a viewing angle is not 0°, and FIG. 8B is a view showing spatial frequency characteristics of the wiring pattern shown in FIG. 8A.

DETAILED DESCRIPTION OF THE INVENTION

Figure 3:
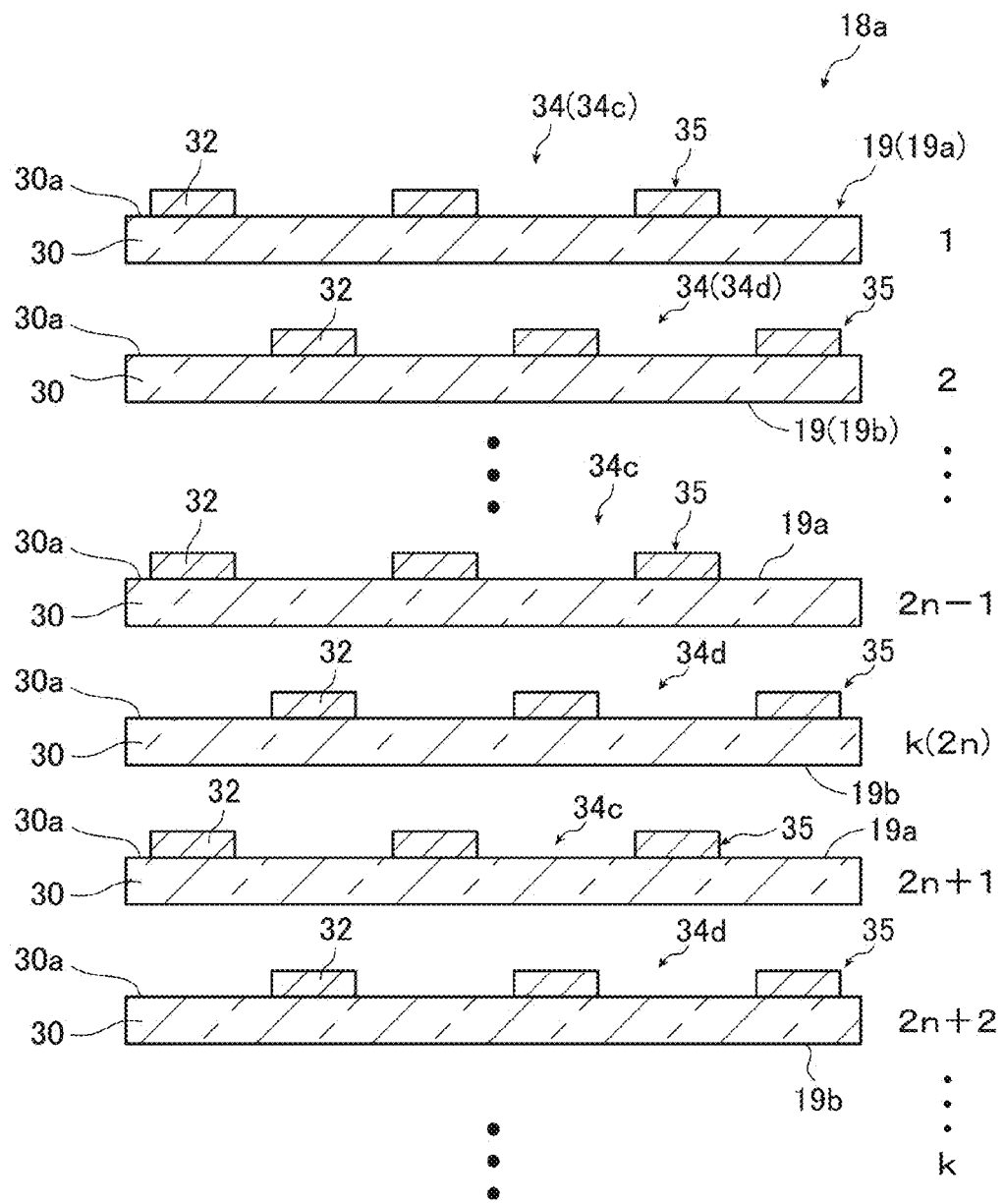
FIG. 3 is a schematic cross-sectional view showing another example of the electroconductive film of the embodiment of the present invention.

Hereinafter, based on a preferable embodiment shown in the attached drawings, an electroconductive film of the present invention as well as a touch panel and a display device provided with the electroconductive film will be described in detail.

In the following description, regarding the electroconductive film of the present invention, an electroconductive film for a touch panel using a liquid crystal display panel (LCD) as a display panel will be described as a typical example. However, the present invention is not limited thereto. The electroconductive film of the present invention is not limited to the electroconductive film for a touch panel and may be any type of electroconductive film as long as it is installed on a display unit of any of various display devices which will be described later. Needless to say, the electroconductive film of the present invention may be, for example, an electroconductive film for an electromagnetic wave shield.

FIG. 1 is a schematic view showing a display device according to the embodiment of the present invention. FIG. 2A is a schematic cross-sectional view showing an example of the electroconductive film of the embodiment of the present invention, and FIG. 2B is a schematic view showing an example of a wiring pattern of the electroconductive film of the embodiment of the present invention.

As shown in FIG. 1, a display device 10 of the present embodiment has a touch sensor 12 (touch panel) in the form of a panel and a display unit 14.

The touch sensor 12 includes a first adhesive layer 16, an electroconductive film 18 of the present embodiment, a second adhesive layer 20, and a protective layer 22 that are laminated on each other in this order, and a detection control portion 23 that is electrically connected to the electroconductive film 18 through a cable 21. The touch sensor 12 is preferably stuck on the display unit 14 through the first adhesive layer 16 or a bonding layer. However, the touch sensor 12 may be simply placed on the display unit 14.

The display unit 14 includes a backlight unit (BLK) 24 that emits planar illumination light and a liquid crystal display cell (LCC) 26 that is illuminated from the rear surface thereof by the backlight unit 24 and constitutes a display portion.

As shown in FIG. 1, the electroconductive film 18 of the present embodiment is installed on the display unit 14 of the display device 10. The electroconductive film 18 is an electroconductive film having a wiring pattern that is excellent in inhibiting the occurrence of moire with respect to the pixel array of the liquid crystal display cell 26, which will be described later, of the display unit 14 and therefore with respect to a black matrix (hereinafter, also referred to as "BM"), particularly, having a wiring pattern that leads to the reduction in occurrence of moire with respect to a black matrix pattern (hereinafter, also referred to as a "BM pattern") regardless of the viewing angle when being superimposed on the BM pattern and that has improved visibility.

As shown in FIG. 2A, the electroconductive film 18 has a transparent substrate 30 and wiring layers 34a and 34b that are formed on a front surface 30a and a rear surface 30b of the transparent substrate 30, respectively, and are each formed of a plurality of thin wires 32 made of a metal (hereinafter, referred to as "thin metal wires").

The transparent substrate 30 is formed of a material having insulating properties and a high degree of translucency. Examples of the material include a resin, glass, silicon, and the like. Examples of the resin include PET (polyethylene terephthalate), PMMA (polymethyl methacrylate), PP (polypropylene), PS (polystyrene), and the like. The transparent substrate 30 has a thickness d of about 100 µm to 150 µm.

The transparent substrate 30 may be constituted with at least one layer.

The wiring layer 34a and the wiring layer 34b have the same or similar wiring patterns 35. The wiring layer 34b as a lower layer is disposed at a displaced position in phase relative to the wiring layer 34a as an upper layer such that each of the thin metal wires 32 of the wiring layer 34b as a lower layer is positioned between two adjacent thin metal wires 32 of the wiring layer 34a as an upper layer. For example, the wiring layer 34b as a lower layer is disposed at the position at which it is displaced in phase by a half (½) pitch relative to the wiring layer 34a as an upper layer. Specifically, as shown in FIG. 2A, the wiring layers 34a and 34b are disposed such that each of the thin metal wires 32 of the wiring layer 34b as a lower layer is positioned in the middle between two adjacent thin metal wires 32 of the wiring layer 34a as an upper layer. In the present Description, such an arrangement of the wiring layer 34a and the wiring layer 34b is referred to as a nested arrangement of the wiring layer 34b as a lower layer relative to the wiring layer 34a as an upper layer. That is, the wiring pattern 35 of the lower layer is disposed at a displaced position in phase relative to the wiring pattern 35 of the upper layer to establish the nested arrangement.

The wiring layers 34a and 34b are collectively called a wiring layer(s) 34. For example, as shown in FIG. 2B, the wiring layer 34 has a wiring pattern 35 in the form of mesh composed of the thin metal wires 32 and having arranged openings 36.

The thin metal wires 32 constituting the wiring layer 34 (34a and 34b) are not particularly limited as long as they are thin wires made of a metal having a high degree of electroconductivity. Examples thereof include wires formed of a wire material such as gold (Au), silver (Ag), or copper (Cu). In view of visibility, the line width of the thin metal wires 32 is preferably small and, for example, should be equal to or less than 30 µm. When the thin metal wires 32 are used for a touch panel, the line width thereof is preferably equal to or greater than 0.1 µm but equal to or less than 15 µm, more preferably equal to or greater than 1 µm but equal to or less than 9 µm, and even more preferably equal to or greater than 2 µm but equal to or less than 7 µm.

In the example shown in FIG. 2B, the mesh shape of the openings 36 of the wiring layer 34 is rhombic but the present invention is not limited thereto. As long as the mesh can constitute the wiring layer 34 that is optimized in terms of the moire visibility with respect to a predetermined BM pattern, which will be described later, and has a polygonal shape having at least three sides, any mesh shape may be employed. Furthermore, the wiring layer 34 may be constituted with a uniform mesh shape or different mesh shapes. Examples of the uniform or different mesh shapes include polygons such as triangles including an equilateral triangle and an isosceles triangle, quadrangles (rectangles) including a square and a rectangle, pentagons, and hexagons.

In the touch sensor 12 shown in FIG. 1, the first adhesive layer 16 is disposed on the rear surface 30b (see FIG. 2A) of the transparent substrate 30 (see FIG. 2A) of the electroconductive film 18 so as to cover the wiring layer 34b (see FIG. 2A). Instead of the first adhesive layer 16, a resin film such as a PET film, a glass plate, or the like may be provided. In such cases, the electroconductive film 18 of the touch sensor 12 is installed on a display surface of the liquid crystal display cell 26 of the display unit 14 via the resin film or the glass plate.

The second adhesive layer 20 (see FIG. 1) is disposed on the front surface 30a (see FIG. 2A) of the transparent substrate 30 (see FIG. 2A) so as to cover the wiring layer 34a (see FIG. 2A).

The material of the first adhesive layer 16 and the second adhesive layer 20 is not limited as long as it is a resin material having adhesion or bonding properties. Examples of the material include a wet lamination adhesive, a dry lamination adhesive, a hot melt adhesive, and the like.

The first adhesive layer 16 and the second adhesive layer 20 may be formed of the same material or different materials.

The protective layer 22 is disposed on the second adhesive layer 20. The protective layer 22 is for protecting the electroconductive film 18. Similarly to the transparent substrate 30, the protective layer 22 is formed of a material having a high degree of translucency, such as a resin, glass, or silicon. For example, the protective layer 22 is constituted with a transparent resin film or a glass plate. A refractive index n1 of the protective layer 22 is preferably equal to or close to a refractive index n0 of the transparent substrate 30. In this case, a relative refractive index nr1 of the transparent substrate 30 with respect to the protective layer 22 is close to 1.

Herein, the refractive index in the present Description means a refractive index for light having a wavelength of 589.3 nm (sodium D-line). For example, in the case of a resin, the refractive index is defined by ISO 14782:1999 that is the international standard (corresponding to JIS K 7105). The relative refractive index nr1 of the transparent substrate 30 with respect to the protective layer 22 is defined by nr1=(n1/n0). Herein, the relative refractive index nr1 is preferably equal to or greater than 0.86 but equal to or less than 1.15, and more preferably equal to or greater than 0.91 but equal to or less than 1.08.

By limiting the relative refractive index nr1 to the above range and controlling the light transmittance between the transparent substrate 30 and the protective layer 22, it is possible to further improve and ameliorate moire visibility.

A refractive index n2 of the second adhesive layer 20 and a refractive index n3 of the first adhesive layer 16 are both equal to or close to the refractive index n0 of the transparent substrate 30. In this case, a relative refractive index nr2 of the transparent substrate 30 with respect to the second adhesive layer 20 and a relative refractive index nr3 of the transparent substrate 30 with respect to the first adhesive layer 16 are both close to 1. Herein, the refractive indices and the relative refractive indices are defined in the same manner as described above. Accordingly, the relative refractive index nr2 of the transparent substrate 30 with respect to the second adhesive layer 20 is defined by nr2=(n2/n0), and the relative refractive index nr3 of the transparent substrate 30 with respect to the first adhesive layer 16 is defined by nr3=(n3/n0).

Similarly to the relative refractive index nr1, the relative refractive index nr2 and the relative refractive index nr3 are preferably equal to or greater than 0.86 but equal to or less than 1.15, and more preferably equal to or greater than 0.91 but equal to or less than 1.08.

By limiting the relative refractive index nr2 and the relative refractive index nr3 to the above range, the moire visibility can be further improved as with the case in which the relative refractive index nr1 is limited to the aforementioned range.

The wiring layers 34a and 34b of the electroconductive film 18 are electrically connected to the detection control portion 23, which is constituted with an electronic circuit formed on a flexible substrate (not shown in the drawing), through the cable 21.

The flexible substrate is an electronic substrate having flexibility. The detection control portion 23 is disposed under the backlight unit 24. However, the arrangement is not limited thereto and can be variously changed with the constitution of the display device 10.

The detection control portion 23 detects, within the region where the wiring layers 34a and 34b are formed, the position at which a contacting body (not shown in the drawing) that is a conductor comes into contact with the electroconductive film 18 from the outside. For example, when the electroconductive film 18 is a capacitance type, the detection control portion 23 is constituted with an electronic circuit which senses the change in capacitance between the contacting body and the electroconductive film 18 that are making contact with or approaching each other, and detects the contacting position or the approaching position.

The electroconductive film 18 shown in FIG. 2A has the wiring layers 34a and 34b respectively provided on both surfaces of the transparent substrate 30, but the present invention is not limited thereto. For example, as an electroconductive film 18a shown in FIG. 3, the electroconductive film of the present invention may be constituted with a plurality of electroconductive film elements 19 (19a and 19b) laminated on each other, the electroconductive film elements 19 respectively having the wiring layers 34 (34c and 34d) formed only on the front surfaces 30a of the transparent substrates 30, that is, each of the electroconductive film elements 19 having the wiring layer 34 only on one surface of the transparent substrate 30. In this way, even when the electroconductive film of the present invention is the electroconductive film 18a in which a plurality of the electroconductive film elements 19 are laminated on each other, the respective wiring layers 34 (34c and 34d) have the wiring patterns 35 that are the same as or similar to each other as described above, and the wiring layer 34 (34c or 34d) as an upper layer is disposed at a displaced position in phase relative to the wiring layer 34 (34d or 34c) as a lower layer to establish the nested arrangement.

Specifically, as shown in FIG. 3, all of the wiring layers 34 of the electroconductive elements 19a each positioned kth from the top (k ($k_{odd}$) is an odd number represented by (2n−1), n=natural number (1, 2, . . . )) are formed of the wiring layers 34c having the same constitution, while all of the wiring layers 34 of the electroconductive elements 19b each positioned Kth from the top (k is an even number represented by 2n, n=natural number (1, 2, . . . )) are formed of the wiring layers 34d having the same constitution. The wiring layers 34c are disposed at a displaced position in phase relative to the wiring layers 34d such that each of the thin metal wires 32 of the even-numbered wiring layers 34d is positioned between two adjacent thin metal wires 32 of the odd-numbered wiring layers 34c, preferably positioned in the middle between two adjacent thin metal wires 32. That is, the wiring layers 34d are disposed at a displaced position in phase relative to the wiring layers 34c in the same manner.

The wiring layers 34, that is, the wiring layer 34c and the wiring layer 34d have the same constitution as the wiring layer 34a and the wiring layer 34b, respectively. Therefore, detailed description thereof will be omitted.

The number of the wiring layers 34 laminated is not particularly limited regardless of which is used, the electroconductive film 18 in which the wiring layer 34a and the wiring layer 34b are formed on both surfaces of the transparent substrate 30 or the electroconductive film 18a obtained by laminating the electroconductive film elements 19 (19a and 19b) each having the wiring layer 34 formed only on one surface of the transparent substrate 30. The number of the wiring layers 34 laminated is appropriately selected according to the specification required for a touch sensor or a touch panel.

The electroconductive films 18 and 18a may be either of a capacitance type or of a resistive film type. Alternatively, the combination of a capacitance type and a resistive film type may be employed.

In the following description, the electroconductive film 18 will be mainly described as a typical example. However, needless to say, the description can be applied to the electroconductive film 18a.

As described above, the display unit 14 has, for example, the backlight unit 24 and the liquid crystal display cell 26.

As the backlight unit 24, known backlights compatible with the liquid crystal display cell 26 can be appropriately used. Needless to say, the backlight is not limited to an edge light type (side light type or light guide plate type) ones and may be of a direct type.

Also as the liquid crystal display cell 26, any of known liquid crystal display cells can be used as long as it is used as a display panel of the display unit 14 and includes a predetermined pixel array pattern. The display panel used in the present invention is not limited to the liquid crystal display cell 26, and display panels such as a plasma display panel (PDP), an organic electroluminescence display panel (GELD), and an inorganic electroluminescence display panel can be used. As the backlight unit 24, backlights compatible with the display panel for use can be appropriately used. Accordingly, depending on the type of the display panel, the backlight unit 24 may not be necessarily provided.

Figure 4:
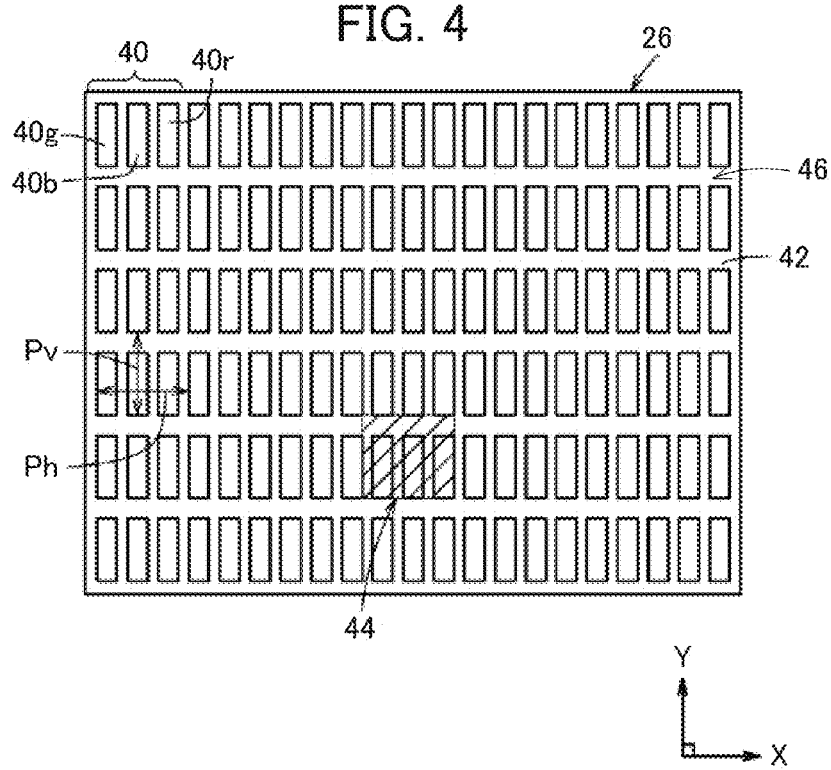
FIG. 4 is a schematic view showing an example of a pixel array pattern of a part of a liquid crystal display portion for which the electroconductive film of the present invention is employed.

FIG. 4 is a schematic view showing an example of a pixel array pattern of a part of a liquid crystal display cell to which the electroconductive film of the present invention is applied.

In the liquid crystal display cell 26 partially shown in FIG. 4, a plurality of pixels 40 are arrayed in the form of matrix and constitutes a predetermined pixel array pattern. A single pixel 40 is constituted with three sub-pixels (a red sub-pixel 40r, a green sub-pixel 40g, and a blue sub-pixel 40b) that are arrayed in the horizontal direction. A single sub-pixel has a rectangular shape that is long in the vertical direction. An array pitch of the horizontal direction (horizontal pixel pitch Ph) of the pixels 40 is approximately the same as an array pitch in the vertical direction (vertical pixel pitch Pv) of the pixels 40. That is, a single pixel 40 and a black matrix (BM) 42 surrounding the single pixel 40 form a square shape (see a shaded area 44). The aspect ratio of a single pixel 40 is not 1 and satisfies the relation of length in the horizontal (crosswise) direction>length in the vertical (lengthwise) direction.

As is evident from FIG. 4, the pixel array pattern constituted with the plurality of pixels 40 each including the red sub-pixel 40r, the green sub-pixel 40g, and the blue sub-pixel 40b is defined by a BM pattern (black matrix pattern) 46 of the BM 42 surrounding each of the red sub-pixel 40r, the green sub-pixel 40g, and the blue sub-pixel 40b, and the moire occurring when the electroconductive film 18 is superimposed on the liquid crystal display cell 26 is caused by the interference between the BM pattern 46 of the BM 42 of the liquid crystal display cell 26 and the wiring layer 34 of the electroconductive film 18. Accordingly, although in a strict sense, the BM pattern 46 is an inverted pattern of the pixel array pattern, in the present Description, the BM pattern 46 is regarded as representing the same pattern as the pixel array pattern.

For example, when the electroconductive film 18 is disposed on the liquid crystal display cell 26 having the BM pattern 46 constituted with the BM 42 of the liquid crystal display cell 26, the wiring layers 34a and 34b of the electroconductive film 18 are optimized in terms of the moire visibility with respect to the BM pattern 46 such that the moire visibility does not depend on the change of the viewing angle. Therefore, even when the viewing angle is changed as described later, there is practically no interference in the spatial frequency between an array period of the pixels 40 and a wiring array period of the thin metal wires 32 of the electroconductive film 18 or 18a, and thus the occurrence of moire is inhibited.

The aforementioned electroconductive films 18 and 18a of the present invention are applied to, for example, the touch sensor 12 of the liquid crystal display cell 26 of the display unit 14 schematically shown in FIG. 1, and each have the wiring pattern 35 that has been optimized in terms of the moire visibility with respect to the pixel array pattern of the display unit 14, and thus, with respect to the BM pattern 46 such that the moire visibility does not depend on the viewing angle (observation angle) with respect to the liquid crystal display cell 26 of the display unit 14. In the present invention, the wiring pattern that has been optimized in terms of the moire visibility with respect to the BM (pixel array) pattern refers to one, two, or more groups of wiring patterns with which moire occurring with respect to a predetermined BM pattern is not visually recognized by a human being even when the viewing angle is changed.

The display device 10 and the electroconductive films 18 and 18a of the present embodiment are basically constituted as above.

Hereinafter, the evaluation of the moire visibility of the wiring pattern of the electroconductive film with respect to a predetermined BM pattern of the display device and the optimization of the wiring pattern leading to the moire visibility which does not depend on the viewing angle (observation angle) in the present invention will be described. That is, in the electroconductive film of the present invention, the wiring pattern optimized such that the moire occurring with respect to a predetermined BM pattern of a display device is not visually recognized by a human being even when the viewing angle is changed and a procedure of determining the optimized wiring pattern will be described.

Herein, the explanation will be made on the optimization of the moire visibility of the wiring pattern with respect to a predetermined BM pattern, the optimization not depending on the viewing angle; that is, the reduction of the occurrence of moire caused by the interference between the BM pattern and the wiring pattern, to be achieved without depending on the viewing angle (observation angle). Before that, the relationship between the wiring pattern of the electroconductive film and the viewing angle will be described first.

Figure 5:
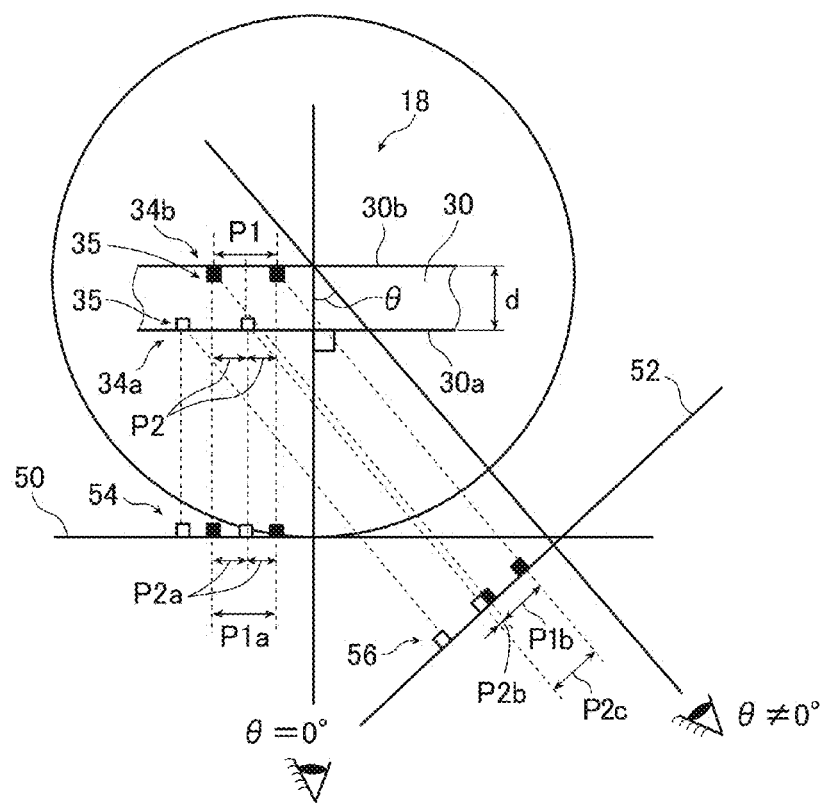
FIG. 5 is a schematic view showing wiring pattern images that are formed in the electroconductive film shown in FIG. 2A with different viewing angles.

FIG. 5 is a schematic view showing an example of different wiring pattern images formed in the electroconductive film shown in FIG. 2A according to different viewing angles.

As shown in the drawing, when the viewing angle θ is zero (θ=0), that is, when the wiring pattern is viewed from a direction perpendicular to the front surface 30a of the transparent substrate 30, the wiring patterns 35 of the wiring layers 34a and 34b of the electroconductive film 18 are observed as a pattern that is projected in the form of a synthetic wiring pattern image 54 on a plane 50 parallel to the front surface 30a of the transparent substrate 30.

In contrast, when the viewing angle θ is not zero (θ≠0), that is, when the wiring pattern is viewed from a direction inclined by a predetermined angle (viewing angle θ) with respect to the direction perpendicular to the front surface 30a of the transparent substrate 30, the wiring layers 34a and 34b of the electroconductive film 18 are projected in the form of a synthetic wiring pattern image 56 on a plane 52 inclined by the angle (viewing angle θ) with respect to the plane 50.

Herein, in the synthetic wiring pattern image 54 formed on the plane 50 and the synthetic wiring pattern image 56 formed on the plane 52, white marks represent projection images resulting from the thin metal wires 32 forming the wiring pattern 35 of the wiring layer 34a on the front side, that is, the observing side, and black marks represent projection images resulting from the thin metal wires 32 forming the wiring pattern 35 of the wiring layer 34b on the rear side.

In the electroconductive film 18, the wiring layers 34a and 34b have the same wiring pattern 35, and the wiring patterns 35 of the wiring layers 34a and 34b have the same pitch P1. Consequentially, when the synthetic wiring pattern image 54 is compared with the synthetic wiring pattern image 56, in the synthetic wiring pattern image 54, pitches (an interval between adjacent white marks and an interval between adjacent black marks) P1a of the projection images of the wiring patterns 35 of the wiring layers 34a and 34b are the same as the pitch P1 (P1a=P1) and do not change from the pitch P1, whereas in the synthetic wiring pattern image 56, because the viewing angle θ is not zero (for example, 0<θ<π/2), pitches P1b of the projection images of the wiring patterns 35 of the wiring layers 34a and 34b are represented by P1 cos θ (P1b=P1 cos θ) with the relationship of 0<cos θ<1 (0<θ<π/2) being established, whereby the pitches P1b are smaller than P1 (P1b=P1 cos θ<P1).

Because the wiring pattern 35 of the wiring layer 34a and the wiring pattern 35 of the wiring layer 34b are displaced in phase from each other by ½ pitch, a pitch (phase difference) P2 between the wiring patterns 35 is to be P1/2 (P2=P1/2). Accordingly, in the synthetic wiring pattern image 54, pitches (intervals between adjacent white mark and black mark) P2a of the projection images of the wiring patterns 35 of the wiring layers 34a and 34b exhibit the same phase difference F and do not change from the pitch P2, whereas in the synthetic wiring pattern image 56, because the viewing angle θ is not zero (for example, 0<θ<π/2), the synthetic wiring pattern image is influenced by the transparent substrate 30 of the electroconductive film 18 and therefore, a pitch P2b and a pitch P2c of the projection images of the wiring patterns 35 of the wiring layers 34a and 34b are represented by P2 cos θ−d sin θ (P2b=P2 cos θ−d sin θ) and P2 cos θ+d sin θ (P2c=P2 cos θ+d sin θ) (absolute value), respectively, with the thickness of the transparent substrate 30 being d. That is, while the pitch P2b is smaller than P2 (P2b<P2), the pitch P2c is greater than P2 (P2c>P2). In other words, a phase difference of d sin θ that depends on the thickness d of the transparent substrate 30 arises between the projection images of the wiring patterns 35 of the wiring layers 34a and 34b.

Consequentially, as described later, in the synthetic wiring pattern image 54, the wiring pitch is an equal pitch (see FIG. 7A). In contrast, in the synthetic wiring pattern image 56, a wiring pattern in which adjacent wiring pitches are not equal to each other is repeated (see FIG. 8A).

This is because the wiring pattern is observed from the direction (viewing angle θ) inclined from the front (viewing angle=0°), and thus the synthetic wiring pattern image is influenced by the thickness d of the transparent substrate 30. In this way, due to the viewing angle θ, the synthetic wiring pattern image 56 of the wiring layers 34a and 34b is influenced by the thickness d of the transparent substrate 30. Note that in FIG. 5, in order to clearly show the thin metal wires 32 constituting the wiring pattern 35, the thickness of the thin metal wires 32 is emphasized relative to the thickness of the transparent substrate 30. However, because the thickness of the thin metal wires 32 is negligible compared to the thickness of the transparent substrate 30, the thickness d of the transparent substrate 30 is described as including the thickness of the thin metal wires 32 constituting the wiring pattern 35.

The visibility of moire is determined from the frequency and the intensity of moire occurring due to the interference between two patterns. Specifically, two dimensional Fourier spectra (2DFFTSp) of pattern data of two patterns are calculated; and from each of the two-dimensional Fourier spectra of two patterns, one spectral peak is selected; and the visibility of moire is determined based on the frequency of moire given by a (spatial) frequency difference between the two spectral peaks, that is, by a relative distance between the spectral peaks on spatial frequency coordinates, and the intensity of moire given by a product of peak intensities of the two spectral peaks.

Meanwhile, in the image (spatial frequency coordinates) of the two-dimensional Fourier spectrum (2DFFTSp) showing the spatial frequency characteristics of a pattern, spectral peaks appear in the form of reciprocals of the pitch of the pattern. Accordingly, in order to predict visually-recognizable moire that occurs due to the interference between the BM pattern of the liquid crystal display cell 26 and the wiring pattern of the wiring layer 34 of the electroconductive film 18, only the pitch (μm) of the BM pattern and the pitch (μm) of the wiring pattern of the wiring layer are needed.

As described above, the visibility of moire is determined by the frequency and the intensity of the moire. However, even when the moire has a frequency at the level of visually-recognizable moire, if the intensity of the moire is not at the level of visually-recognizable moire, the moire is not visually recognized in practice. Furthermore, even when the intensity is enough, if the frequency of the moire is not at the level of visually-recognizable moire, the moire is not visually recognized.

Therefore, normally, from the viewpoint of optimizing the visibility of moire, the intensity of moire should be considered as described above. However, when the visually-recognizable moire that occurs due to the interference between the BM pattern and the wiring pattern is considered, and when considered is the moire that depends on the angle at which the BM pattern, i.e., the display screen of the liquid crystal display cell 26 is observed, that is, depends on the viewing angle, it is difficult to define the intensity of the moire with the viewing angle. The reason is as follows. As described above, provided that the pitch of the projection image of the wiring pattern 35 of each of the wiring layers 34a and 34b is equal to the pitch P1 of the wiring pattern 35, if the viewing angle θ is changed, the pitch of the projection image is changed according to P1 cos θ with the viewing angle θ as a parameter. In addition, the phase of the wiring pattern 35 of one of the wiring layers, e.g., the wiring layer 34b, with respect to the wiring pattern 35 of the other of the wiring layers, e.g., the wiring layer 34a, is changed according to d sin θ with the thickness d of the transparent substrate 30 and the viewing angle θ as parameters. As a result, the peak frequency and the peak intensity obtained from the spectral peaks are changed, and thus the frequency and the intensity of the moire also varies. Herein, θ represents a viewing angle, and as shown in FIG. 5, θ of the front direction is 0°.

For the aforementioned reason, in the present invention, moire is predicted by using only the frequency.

Figure 6:
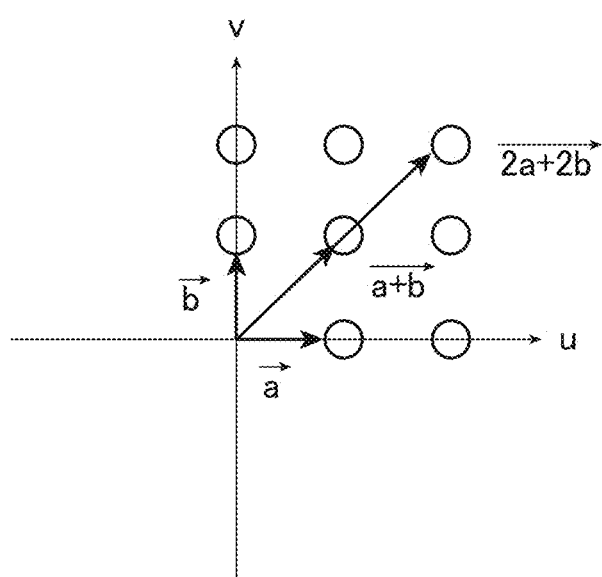
FIG. 6 is a graph showing frequency peak positions of moire.

In order to obtain the peak frequencies used for the 2DFFT (two-dimensional fast Fourier transform) processing, for calculating peaks, frequency peaks (peak frequencies) are obtained from the basic frequencies of the BM pattern 46 and the wiring pattern of the wiring layer 34. This is because the data used for the 2DFFT processing is in the form of a discrete value, and thus the peak frequencies (frequencies of spectral peaks) of the two-dimensional Fourier spectra depend on the reciprocal of the image size. As shown in FIG. 6, the positions of the frequency peaks (positions of the spectral peaks) of the two-dimensional Fourier spectra can be expressed in the form of a combination of bars a and b which are independent two-dimensional basic frequency vector components. Accordingly, naturally, the obtained peak positions form a lattice shape. Although FIG. 6 is a graph showing frequency peak positions of the wiring layer 34, the frequency peak positions of the BM pattern 46 can also be determined in the same manner as used for the wiring layer 34.

For example, the synthetic wiring pattern image 54 of the wiring layers 34a and 34b shown in FIG. 7A that was obtained by front observation (viewing angle=0°) was subjected to two-dimensional Fourier transform, and a two-dimensional Fourier spectrum was obtained. In this way, the spatial frequency characteristics (FFT image) of the synthetic wiring pattern image 54 of the wiring layers 34a and 34b were obtained. The result is shown in FIG. 7B.

Furthermore, the synthetic wiring pattern image 56 of the wiring layers 34a and 34b shown in FIG. 8A that was obtained by oblique observation (viewing angle≠0°) was subjected to two-dimensional Fourier transform, and a two-dimensional Fourier spectrum was obtained. In this way, the spatial frequency characteristics (FFT image) of the synthetic wiring pattern image 56 of the wiring layers 34a and 34b were obtained. The result is shown in FIG. 8B.

Herein, as shown in FIG. 5, the pitch P1b of the synthetic wiring pattern image 56 at the time of oblique observation (viewing angle≠0°) is smaller than the pitch P1a of the synthetic wiring pattern image 54 at the time of front observation (viewing angle=0°) in accordance with the observation direction. For obtaining the spatial frequency characteristics (FFT image) of the synthetic wiring pattern image 56 at the time of oblique observation (viewing angle≠0°), the pitch P1b of the synthetic wiring pattern image 56 at the time of oblique observation is widened such that the pitch P1b is the same as the pitch P1a at the time of front observation, which will be described later in detail.

As described above, in the image obtained by oblique observation (see FIG. 8A), the wiring pattern in which adjacent wiring pitches are not equal to each other is repeated, unlike in the image obtained by front observation (see FIG. 7A) in which the wiring pitch is an equal pitch.

Therefore, the peak interval between spectral peaks is smaller in the FFT image obtained by oblique observation (see FIG. 8B) than in the FFT image obtained by front observation (see FIG. 7B). Accordingly, when the wiring pattern is superimposed on the BM pattern, the image quality deteriorates in accordance with the viewing angle.

In the FFT images (on the spatial frequency coordinates) shown in FIGS. 7B and 8B, the white points and the grey points in the black ground represent spectral peaks. The concentrations of the white points and the grey points depend on the peak intensity of the spectral peaks. However, for optimization of the visibility of moire in the present invention, the peak intensity is not considered, and the peak frequencies of the spectral peaks are used. Accordingly, the peak positions on the spatial frequency coordinates are represented by the white points and the grey points.

For obtaining peak frequencies of spectral peaks of the wiring pattern (synthetic wiring pattern) and the BM pattern, for example, only the peaks which show the intensity equal to or greater than a specific degree when the frequency characteristics (peak frequency and peak intensity) of each of the patterns are convolved with the standard visual response characteristics of human beings, may be selected in advance. By doing so, only the difference between the selected peaks is obtained, and accordingly, the time taken for calculation can be shortened.

In order to prevent the image quality from deteriorating in accordance with the viewing angle when the wiring pattern is superimposed on the BM pattern, the image quality of the wiring pattern designed for viewing from the front in the wiring layer needs to avoid deteriorating in accordance with the viewing angle. In order to satisfy the aforementioned condition, when the frequency characteristics of the wiring pattern of the wiring layer designed for viewing from the front (synthetic wiring pattern image 54 (see FIG. 5)) are compared with the frequency characteristics of the wiring pattern of the wiring layer resulting from the phase difference (synthetic wiring pattern image 56 (see FIG. 5)), the condition needs to be satisfied, as follows: image quality in front viewing image quality depending on the viewing angle. That is, the frequency of moire observed from the front and the frequency of moire obliquely observed and varying depending on the viewing angle needs to be predicted.

When a plurality of layers of wiring patterns of the wiring layers are laminated on each other as shown in FIG. 3, it is premised that the wiring layers 34 (34c and 34d) are in the nested arrangement as described above with k=1 (the first layer) and K=2 (the second layer), and the synthetic wiring pattern image 54 has a single frequency at the time of front observation.

Herein, considering the variation in manufacturing, even when an error of about 5% occurs in wiring patterns of wiring layers, the wiring patterns are regarded as having a substantially constant regular pattern.

When a plurality of wiring layers having the wiring patterns are laminated on each other, from the viewpoint of improving transmittance, the wiring layers 34 (34c and 34d) are disposed at a displaced position in phase relative to each other with k=2n and k=2n+1, similarly to the wiring layers 34a and 34b, and in the nested arrangement as described above.

Herein, all of the wiring patterns of the wiring layers have an equal pitch. That is, the interval between adjacent thin metal wires 32 are the same. In the present invention, it is premised that each of the thin metal wires 32 of the wiring layer as a lower layer is positioned in the pitch between the thin metal wires 32 of the wiring layer as an uppermost layer. In the example illustrated in FIG. 3, a thin metal wire 32 of the second wiring layer 34 is disposed between two thin metal wires 32 from the left of the uppermost wiring layer 34. Likewise, also in the case of the third wiring layer 34 and the following layers disposed thereunder, a thin metal wire 32 of a wiring layer 34 is disposed between two thin metal wires 32 from the left of the uppermost wiring layer 34. Even when the number of the layers laminated is increased, each of the thin metal wires 32 of the wiring layers as lower layers is positioned in the pitch between adjacent two thin metal wires 32 of the wiring layer as the uppermost layer.

In order to predict the frequency characteristics of the wiring patterns (see the synthetic wiring pattern image 56) of the wiring layers 34 in consideration of up to kth wiring layer 34 in accordance with the viewing angle based on the aforementioned premise, provided that a basic frequency (a frequency of a lowest peak frequency component) of the wiring pattern (see the synthetic wiring pattern image 54) constituted with the wiring layers 34 with k=1 and k=2 is f1, the wiring pattern needs to be designed in consideration of f1/2 from the repeating patterns formed in the wiring layers 34 with k=1 and k=2. For example, when k=2, the frequency characteristics of front viewing is f1, and the frequency characteristics depending on the viewing angle is f1/2. That is, the frequency characteristics depending on the viewing angle are a half of the frequency characteristics of front viewing.

The moire occurring at the time of front observation can be represented by convolution of the frequency characteristics f1 at the time of the front observation of the wiring pattern of the wiring layer with the spatial frequency characteristics of the BM pattern. The frequency of moire that depends on the viewing angle, that is, the frequency of moire that occurs at the time of oblique observation can also be represented by convolution of the frequency characteristics f1/2 of the wiring pattern of the wiring layer depending on the viewing angle (in the oblique observation) with the spatial frequency characteristics of the BM pattern.

Hereinafter, the present invention will be more specifically described taking the case of k=2 as an example.

Herein, when k=2, examples of the constitution include the electroconductive film 18 shown in FIG. 2A that has the wiring layers 34a and 34b on both surfaces of the single transparent substrate 30, and the electroconductive film 18a shown in FIG. 3 that is a laminate of a transparent substrate 30 having on its front surface 30a the wiring layer 34c and another transparent substrate 30 having on its front surface 30a the wiring layer 34d.

Figure 9B:
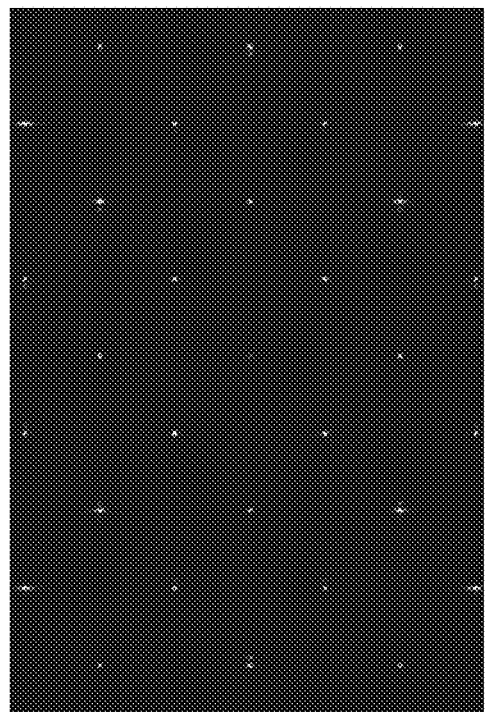
FIG. 9B is a view showing spatial frequency characteristics of the wiring pattern shown in FIG. 9A.
Figure 9A:
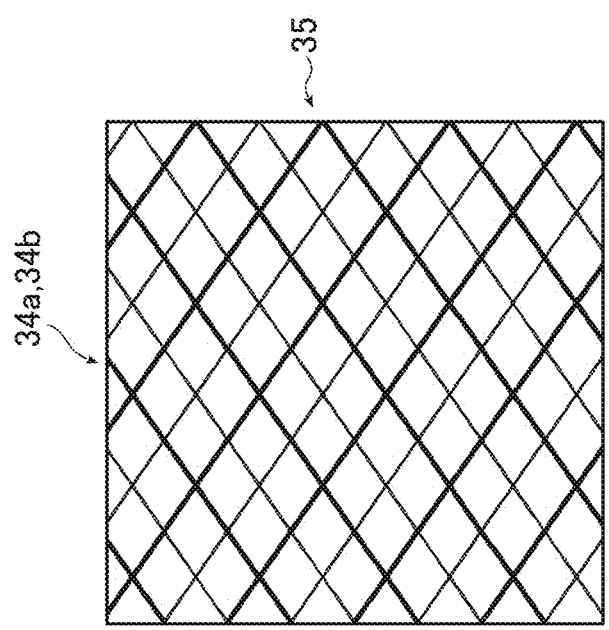
FIG. 9A is a schematic view showing a wiring pattern formed when a viewing angle is 0° C.

The wiring pattern shown in FIG. 9A that is observed from the front is subjected to the 2DFFT processing to obtain the two-dimensional Fourier spectrum, whereby the spatial frequency characteristics (FFT image) shown in FIG. 9B can be obtained.

Figure 10A:
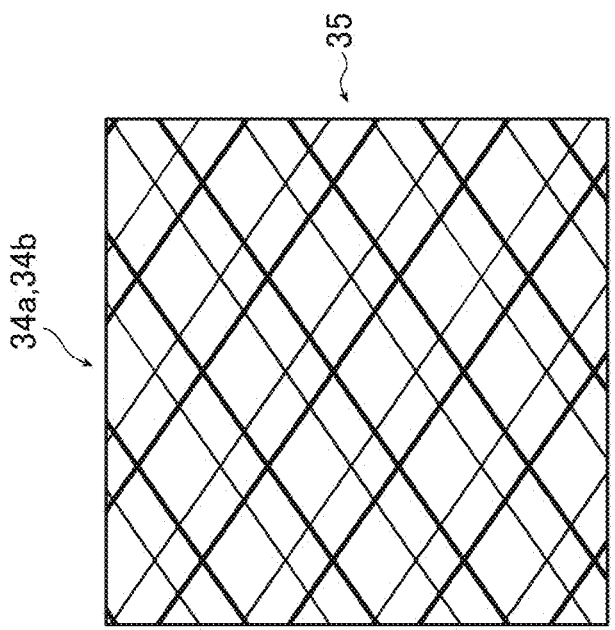
FIG. 10A is a schematic view showing a wiring pattern formed when a viewing angle is not 0°.
Figure 10B:
FIG. 10B is a view showing spatial frequency characteristics of the wiring pattern shown in FIG. 10A.

Meanwhile, the obliquely observed wiring pattern shown in FIG. 10A is subjected to the 2DFFT processing to obtain the two-dimensional Fourier spectrum, whereby the spatial frequency characteristics (FFT image) shown in FIG. 10B can be obtained.

Similarly to the cases of FIGS. 7B and 8B, in FIGS. 9B and 10B, for obtaining the frequency characteristics (FFT image) of the wiring pattern image at the time of oblique observation (viewing angle≠0°), the pitch P1b of the synthetic wiring pattern image 56 at the time of oblique observation is widened such that the pitch P1b is equal to the pitch P1a at the time of front observation, the details of which will be described later.

In the FFT images (on the spatial frequency coordinates) shown in FIGS. 9B and 10B, the white points and the grey points in the black ground represent spectral peaks, and the concentrations of the white points and the grey points depend on the peak intensity of the spectral peaks. However, for optimization of the visibility of moire in the present invention, the peak intensity is not considered, and the peak frequencies of the spectral peaks are used. Accordingly, the peak positions on the spatial frequency coordinates are represented by the white points and the grey points.

Comparing the spatial frequency characteristics shown in FIG. 9B that are obtained through front observation with the spatial frequency characteristics shown in FIG. 10B that are obtained through oblique observation, the peak interval of the spectral peaks in the FFT image of oblique observation is a half of the peak interval of the spectral peaks in the FFT image of front observation. It means that because the viewing angle is not zero, one of the wiring patterns is displaced in phase from the other wiring pattern, and thus the period of the wiring patterns is doubled. This agrees with the aforementioned fact that the frequency characteristics depending on the viewing angle is f1/2.

The frequency characteristics of the BM pattern are determined by the constitution of the liquid crystal display cell 26 and are constant. Therefore, in order to satisfy the condition of "quality of image observed from the front≥quality of image observed at a viewing angle of not zero," under the condition that in the two-dimensional Fourier spectra, the frequency of the BM pattern and the frequency of the wiring pattern of the wiring layer are considered up to the tenth order, provided that the lowest frequency of the moire observed from the front is a first lowest frequency fm1 and the lowest frequency of the moire observed at a viewing angle of not zero is a second lowest frequency fm2, the wiring layer needs to have a wiring pattern that satisfies fm1≤fm2.

This is because the frequency of the moire visually recognized from the oblique direction is to be the value obtained by adding +α, which is the increase in peak of the wiring pattern caused by observing the moire from the oblique direction, to the frequency of the moire visually recognized from the front direction. Consequentially, the image quality is the best when the image is viewed from the front and is always poorer when the image is viewed from the oblique direction. In order to suppress the deterioration of image quality to a maximum extent, it is necessary to make the first lowest frequency fm1 equal to or lower than the second lowest frequency fm2. Accordingly, in the present invention, the wiring layer is configured to satisfy the condition of fm1≤fm2. When fm1=fm2, the quality of image observed from the oblique direction does not deteriorate, and "image quality in front viewing" is equal to "image quality depending on the viewing angle."

As shown in FIG. 5, when the viewing angle is not zero, the pitch P1b of the wiring pattern is smaller than the pitch P1a of the wiring pattern observed from the front. In the present invention, under a precondition that the pitch of the wiring pattern in the case in which the viewing angle is not zero is the same as the pitch of the wiring pattern observed from the front, the spatial frequencies of these wiring patterns are obtained. Therefore, the pitch of the wiring pattern when the viewing angle is not zero needs to be widened so as to be the same as the pitch of the wiring pattern observed from the front. In the BM pattern, when the viewing angle is not zero, the same issue as with the pitch of the wiring pattern arises. Accordingly, also in the BM pattern, the pitch is also widened so as to be the same as the pitch at the time of front observation.

Hereinafter, the process of widening the pitch of the wiring pattern when the viewing angle is not zero such that the pitch becomes the same as the pitch of the wiring pattern observed from the front is simply referred to as "standardization."

Regarding the standardization, when the viewing angle θ is known beforehand, the standardization can be performed by using 1/cos θ as a coefficient of viewing angle dependency for the pitch of the wiring pattern at the time of oblique observation. In this case, also for the BM pattern, the use of 1/cos θ can make the pitch the same as the pitch at the time of front observation.

In addition, the standardization can also be performed by using the BM pattern in the following manner.

For example, when the BM pattern assumes a square when viewed from the front and assumes a rectangle when viewed from the oblique direction, a coefficient (enlargement ratio) is calculated for use in enlarging the rectangle to be the square at the time of front observation. The standardization can be performed using the coefficient. Likewise, also for the BM pattern, the use of the coefficient can make the pitch the same as the pitch at the time of front observation in the same manner as used for the pitch of the wiring pattern. The standardization method is not limited to the aforementioned methods as long as the standardization is accomplished.

In the aforementioned precondition, the spatial frequency when the viewing angle is not zero includes the spatial frequency at the time of front observation. This point will be specifically described below.

When FIG. 7B and FIG. 8B are superimposed on each other, the spectral peaks of FIG. 7B completely overlap the spectral peaks of FIG. 8B. This is because under the aforementioned precondition, the repetition period of the wiring pattern observed at a viewing angle of not zero is a twice as long as the repetition period of the wiring pattern observed from the front. As a result, the frequency peaks of the wiring pattern observed at a viewing angle of not zero appear at an interval which is a half of the interval of the frequency peaks of the wiring pattern observed from the front, and thus the spectral peaks completely overlap with each other. Consequentially, the spectral peaks of FIG. 7B includes all of the positions of the spectral peaks of FIG. 8B.

As described above, the frequency of moire is given by the difference in spatial frequency between the peaks of the wiring pattern and the peaks of the BM pattern (relative distance between peaks on the spatial frequency coordinates). Therefore, the frequency of the moire visually recognized from the oblique direction is to be a value obtained by adding +α, which is the increase in peak of the wiring pattern caused by observing the moire from the oblique direction, to the frequency of the moire visually recognized from the front direction.

Figure 11A:
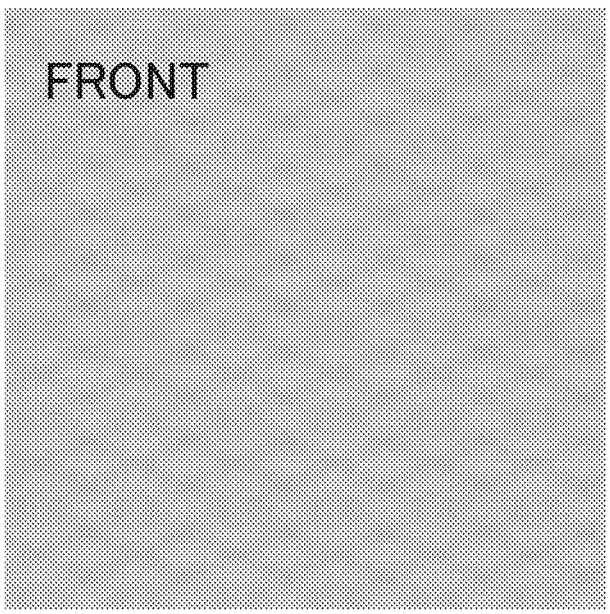
FIGS. 11A and 11B are views respectively showing an exemplary front observation image and an exemplary oblique observation image in the invention, with the condition of a first lowest frequency fm1≤a second lowest frequency fm2, which is a spatial frequency condition of moire of the present invention, being satisfied.
Figure 11B:
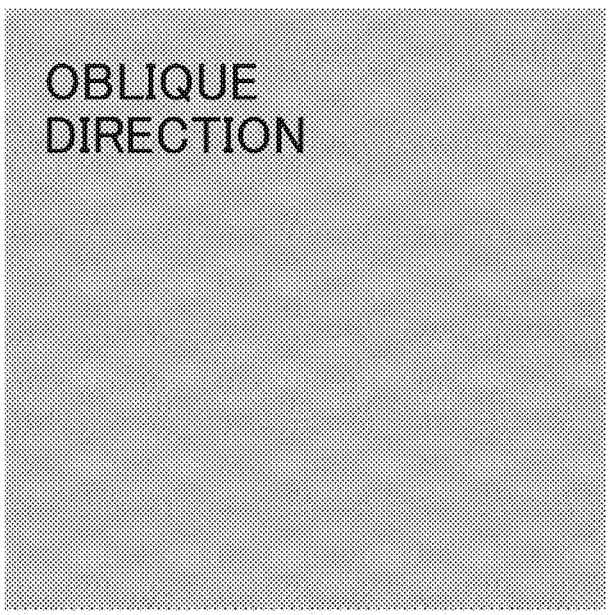

FIGS. 11A and 11B respectively show a front observation image and an oblique observation image in an example of the invention in which the condition of first lowest frequency fm1 second lowest frequency fm2, i.e., a spatial frequency condition of the invention, is satisfied.

Figure 12A:
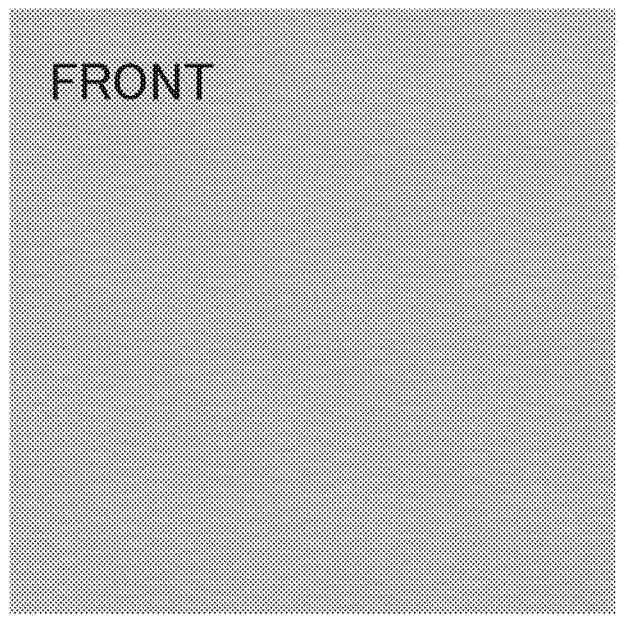
FIGS. 12A and 12B are views respectively showing an exemplary front observation image and an exemplary oblique observation image in a comparative example, with the condition of the first lowest frequency fm1≤the second lowest frequency fm2, which is the spatial frequency condition of moire of the present invention, being not satisfied.
Figure 12B:
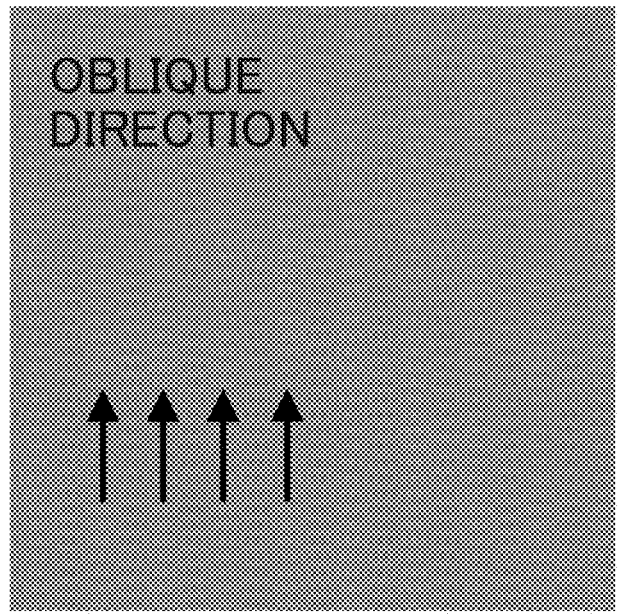

FIGS. 12A and 12B respectively show a front observation image and an oblique observation image in a comparative example in which the condition of first lowest frequency fm1 second lowest frequency fm2, i.e., the spatial frequency condition of the invention, is not satisfied.

In the examples of the present invention shown in FIGS. 11A and 11B that satisfy fm1≤fm2, even when the observation direction is changed from the front direction to the oblique direction, low-frequency moire does not newly occur although in the figures, the wiring patterns are emphasized for the purpose of showing the change in the wiring patterns caused with the change in the observation direction from the front direction to the oblique direction.

In contrast, as is evident from the comparative examples shown in FIGS. 12A and 12B that do not satisfy fm1≤fm2, moire is not visually recognized at all when the observation direction is the front direction, but when the observation direction is the oblique direction, low-frequency moire newly occurs as indicated by arrows in FIG. 12B.

As described above, it is evident that when fm1≤fm2, i.e., the spatial frequency condition of moire is satisfied in the present invention, the occurrence of moire can be reduced.

In the present invention, in order to calculate the frequency of moire, for both the BM pattern and the wiring pattern, the frequencies of two-dimensional Fourier spectra up to the tenth order (up to the tenth order peak frequency) are used. This is because the present inventor has a rule of thumb in which by using the frequencies of two-dimensional Fourier spectra up to the tenth order, substantially all of visually-recognizable moire is included. That is, the peak intensity of the two-dimensional Fourier spctra of a term of the eleventh or higher order is ignorable since it does not lead to visually-recognizable moire.

Herein, the visually-recognizable moire refers to the moire having an intensity of, for example, equal to or greater than −4.0 in terms of a common logarithm (equal to or greater than $10^{-4}$ in terms of an antilogarithm).

Accordingly, in the display device 10 and the electroconductive film 18, when the wiring layers 34a and 34b laminated on each other satisfy fm1≤fm2 as described above, even in the case in which the electroconductive film 18 is superimposed on the BM pattern 46 of the liquid crystal display cell 26, it is possible to reduce the occurrence of moire resulting from the interference between the wiring pattern 35 of the electroconductive film 18 and the BM pattern 46 of the liquid crystal display cell 26, regardless of the viewing angle. As a result, in the display device 10, the quality of an image observed from the oblique direction can be improved, and the overall image quality including the viewing angle and the like can be further improved.

Next, the procedure of determining a wiring pattern, which can reduce the occurrence of moire regardless of the viewing angle in the electroconductive film 18 superimposed on the liquid crystal display cell 26 of the display device 10 will be described.

Figure 13:
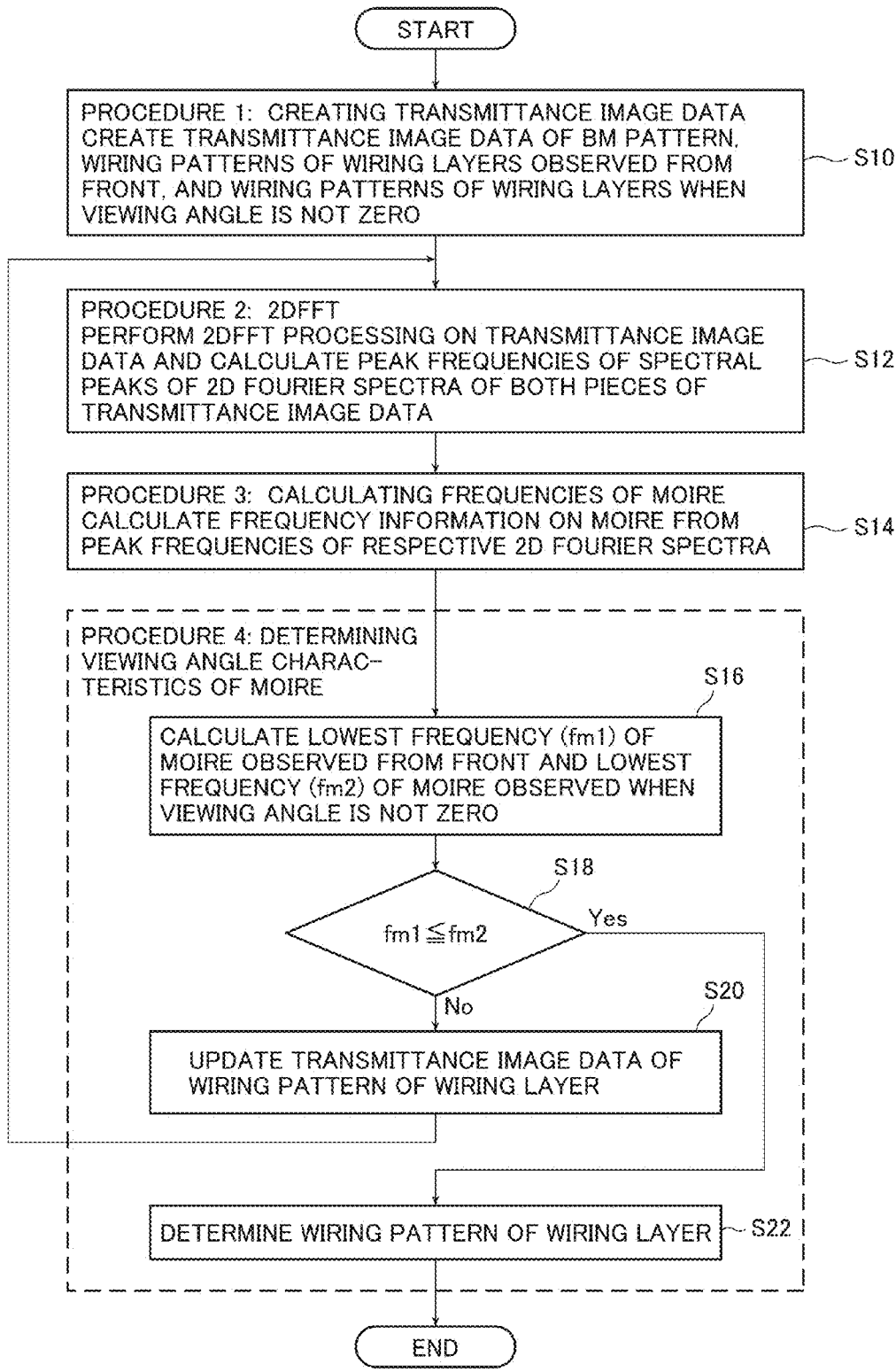
FIG. 13 is a flowchart showing an example of a determination method of a wiring pattern of the electroconductive film of the embodiment of the present invention.

FIG. 13 is a flowchart showing an example of a determination method of the wiring pattern of the wiring layer of the electroconductive film of the present invention.

In the determination method of the wiring pattern of the wiring layer of the electroconductive film of the present invention, the BM pattern 46 of the liquid crystal display cell 26 of the display device 10 and the wiring pattern 35 of the wiring layers 34a and 34b of the electroconductive film 18 are subjected to frequency analysis by using two-dimensional fast Fourier transform (2DFFT); from the moire frequencies given as a difference between the peak frequencies of both patterns (relative distance between peak positions) from the spatial frequency characteristics of the respective patterns obtained by the frequency analysis, the lowest frequencies of the moire are calculated; and by using the calculated lowest frequencies of the moire, the wiring pattern of the wiring layer capable of reducing the moire occurrence regardless of the viewing angle is determined. For calculating the frequency of moire, FFT is generally used. However, because the frequency of an object greatly varies depending on the usage of the FFT, the procedure is specified as below.

In the determination method, first, as Procedure 1, pieces of transmittance image data of the BM pattern and the wiring patterns of the wiring layers are created. That is, as shown in FIG. 13, in Step S10, a piece of transmittance image data of the BM pattern 46 (BM 42) (see FIG. 4) of the liquid crystal display cell 26 of the display device 10 shown in FIG. 1 and pieces of transmittance image data of the wiring patterns of the wiring layers 34a and 34b (thin metal wires 32) (see FIG. 14B) of the electroconductive film 18 are created and obtained.

In this case, regarding the wiring layers 34a and 34b, for the synthetic wiring pattern when the viewing angle is zero, that is, in the case of front observation, and for the synthetic wiring pattern when the viewing angle is not zero, that is, in the case of oblique observation, separate pieces of transmittance image data are created.

In the present embodiment, a key point is how accurately the frequency is extracted from the two-dimensional Fourier spectra. Therefore, the pieces of transmittance image data of the BM pattern and the wiring patterns of the wiring layers are created using the periodic boundary condition.

Herein, when the pieces of transmittance image data of the BM pattern 46 and the wiring patterns of the wiring layers 34a and 34b (including both the cases in which the viewing angle is zero and not zero) are prepared or stored beforehand, the transmittance image data may be acquired from the prepared or stored data.

Figure 14A:
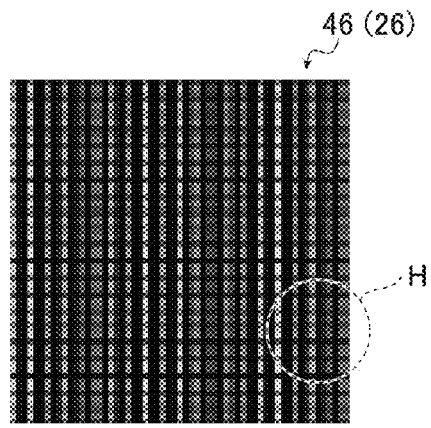
FIG. 14A is a schematic view showing an example of a pixel array pattern of a display unit of the embodiment of the present invention.
Figure 14B:
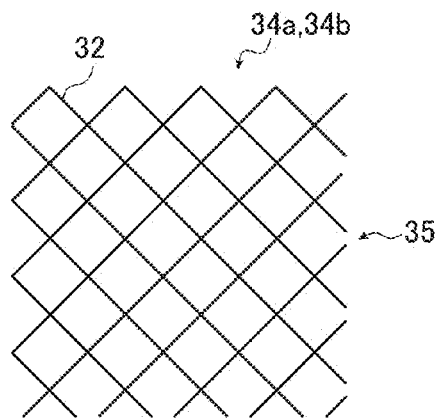
FIG. 14B is a schematic view showing an example of a wiring pattern of an electroconductive film to be superimposed on the pixel array pattern of FIG. 14A.
Figure 14C:
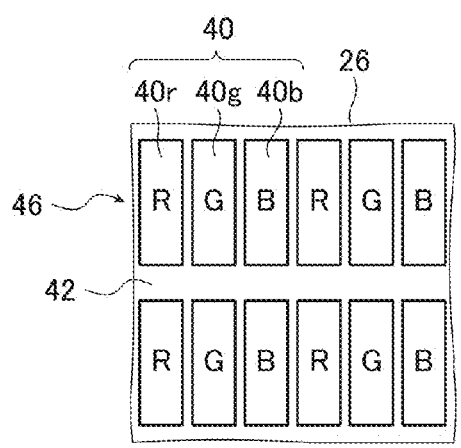
FIG. 14C is a partially enlarged view of the pixel array pattern of FIG. 14A.

As shown in, for example, FIG. 14A and FIG. 14C which is a partially enlarged view of the region H of FIG. 14A, the BM pattern 46 of the liquid crystal display cell 26 can be in the form of a pattern in which a single pixel 40 is an RGB color pixel constituted with the red sub-pixel 40r, the green sub-pixel 40g, and the blue sub-pixel 40b. However, when a single color is used, for example, when only the green sub-pixel 40g of G channel is used, the transmittance image data of R and B channels is preferably set to be 0. In the present invention, the image data of the BM 42, that is, the transmittance image data of the BM pattern 46 is not limited to the pattern shown in FIG. 14A in which the BM 42 has rectangular openings (the red sub-pixels 40r, the green sub-pixels 40g, and the blue sub-pixels 40b). A usable BM pattern may not have rectangular openings, or a BM pattern having BM openings of any shape may be designated and used. For example, the opening is not limited to a simple rectangular shape, and may have an intricately doglegged shape or a hook-like shape.

Meanwhile, in the wiring layers 34a and 34b of the electroconductive film 18, for example, as shown in FIG. 14B, the wiring pattern 35 is in a square lattice shape in which the thin metal wires 32 forming the wiring are inclined by 45°. The wiring layer 34a is disposed on the front surface (not shown in the drawing) of the transparent substrate 30 (not shown in the drawing), and the wiring layer 34b is disposed on the rear surface (not shown in the drawing) of the transparent substrate 30 (not shown in the drawing).

Herein, the size of the transmittance image data of the BM pattern 46 and the wiring patterns of the wiring layers 34a and 34b is not particularly limited as long as the transmittance image data of the BM pattern 46 and the wiring patterns of the wiring layers 34a and 34b can be taken out based on a certain period by using the periodic boundary condition. Herein, the phrase "based on a certain period" refers to the state in which the image is repeated on a period basis and for example, in the case of the wiring patterns of the wiring layers 34a and 34b, refers to the state shown in FIG. 9A. As described above, when the transmittance image data can be taken out based on a certain period by using the periodic boundary condition, the image is repeated on a period basis, and thus folding processing or flipping processing is not necessary.

Thereafter, as Procedure 2, each piece of the transmittance image data created in Procedure 1 is subjected to two-dimensional fast Fourier transform (2DFFT (base 2)). That is, as shown in FIG. 13, in Step S12, the respective pieces of transmittance image data of the BM pattern 46 and the wiring layers 34 created in Step S10 are subjected to 2DFFT (base 2). Then, from the two-dimensional Fourier spectra of the respective pieces of transmittance image data of the BM pattern 46 and the wiring layers 34, peak frequencies of a plurality of spectral peaks are calculated.

Figure 15:
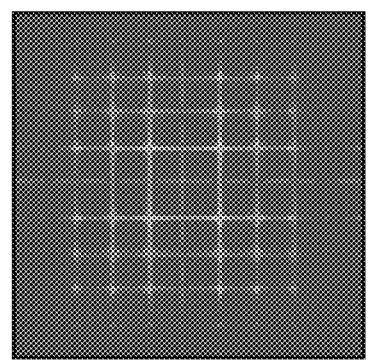
FIG. 15 is a schematic view showing spatial frequency characteristics of a two-dimensional Fourier spectrum of transmittance image data of a pixel array pattern of a black matrix.

FIG. 15 is a view showing the spatial frequency characteristics of the two-dimensional Fourier spectrum of the transmittance image data of the BM pattern. In FIG. 15, the white portions represent the spectral peaks of the BM pattern 46. From the results shown in FIG. 15, the peak frequencies of the spectral peaks are calculated for the BM pattern 46. That is, the positions of the spectral peaks of the two-dimensional Fourier spectrum of the BM pattern 46 shown in FIG. 15 on frequency coordinates, in other words, the peak positions represent peak frequencies. The intensities of the two-dimensional Fourier spectrum at the peak positions represent the peak intensities.

Regarding the wiring layers 34a and 34b, for example, when the viewing angle is zero, that is, when the wiring pattern is observed from the front, the spatial frequency characteristics of the two-dimensional Fourier spectrum shown in FIG. 9B are used. When the viewing angle is not zero, that is, when the wiring pattern is obliquely observed, the spatial frequency characteristics of the two-dimensional Fourier spectrum shown in FIG. 10B are used.

The frequencies of the respective spectral peaks of the BM pattern 46 and the wiring layers 34a and 34b are calculated and obtained in the following manner.

The peak frequencies of the BM pattern 46 and the wiring patterns of the wiring layers 34a and 34b can be obtained in the aforementioned manner.

Next, as Procedure 3, frequency information on moire is calculated. That is, as shown in FIG. 13, in Step S14, from the difference of the peak frequencies of the respective two-dimensional Fourier spectra of the BM pattern 46 and the wiring layers 34a and 34b as calculated in Step S12, a large number of moire frequencies are calculated as frequency information on the moire. In the present invention, for the peak frequencies of the two-dimensional Fourier spectra, it is preferable to use frequencies up to the tenth order based on the aforementioned rule of thumb in which substantially all of visually-recognizable moire can be included by using frequencies up to the tenth order.

In the real space, the moire originally occurs by the multiplication of the transmittance image data of the wiring patterns of the wiring layers 34a and 34b and the transmittance image data of the BM pattern 46 and accordingly, in the frequency space, convolution integral of these pieces of transmittance image data is performed. As a result, the moire frequencies between the BM pattern 46 and the wiring layers 34a and 34b observed from the front are obtained, and the moire frequencies between the BM pattern 46 and the wiring layers 34a and 34b when the viewing angle is not zero are obtained.

Subsequently, as Procedure 4, viewing angle characteristics of the moire are determined.

Specifically, first, as shown in FIG. 13, in Step S16, by using the frequency information on the moire that has been obtained in Step S14, the lowest frequency is calculated from a large number of moire frequencies of the BM pattern 46 and the synthetic wiring pattern of the wiring layers 34a and 34b observed from the front. This lowest frequency is taken as the first lowest frequency fm1.

Then, from a large number of moire frequencies of the BM pattern 46 and the synthetic wiring pattern of the wiring layers 34a and 34b when the viewing angle is not zero, the lowest frequency is calculated. This lowest frequency is taken as the second lowest frequency fm2.

Thereafter, in Step S18, the first lowest frequency fm1 is compared with the second lowest frequency fm2.

When the first lowest frequency fm1 is equal to or lower than the second lowest frequency fm2, that is, the condition of fm1≤fm2 is satisfied, the wiring pattern of the wiring layer is determined (Step S22).

In contrast, when the first lowest frequency fm1 is not equal to or lower than the second lowest frequency fm2, that is, the condition of fm1≤fm2 is not satisfied, the transmittance image data of the wiring pattern of the wiring layer is updated (Step S20), and then the process returns to Step S12.

Herein, the new wiring pattern of the wiring layer provided at the update may be prepared beforehand or newly created. In the case of newly creating the wiring pattern, any one or more among the rotation angle, the pitch, and the pattern width of the transmittance image data of the wiring pattern of the wiring layer may be changed, or the shape or the size of the openings of the wiring pattern of the wiring layer may be changed. Alternatively, these may be combined as appropriate.

Then, the Step S12 for calculating peak frequencies, Step S14 for calculating the frequency information on moire, Step S16 for calculating the first lowest frequency fm1 and the second lowest frequency fm2, Step S18 for comparing the first lowest frequency fm1 with the second lowest frequency fm2, and Step S20 for updating the transmittance image data of the wiring pattern of the wiring layer are repeated until the condition of $fm1 \leq fm2$ is satisfied.

In this way, the determination method of the wiring pattern of the wiring layer of the electroconductive film of the present invention ends. Thus, the determination method makes it possible to obtain the electroconductive film of the present invention having a wiring pattern with which the occurrence of moire is inhibited when the wiring pattern is superimposed on the BM pattern of a display unit of a display device and even when the viewing angle is not zero. It is also possible to obtain the touch sensor 12 (touch panel) and the display device 10 each of which is provided with the electroconductive film 18 having the aforementioned wiring pattern.

The present invention is basically constituted as above. Up to now, the electroconductive film of the present invention and the touch panel and the display device which are provided with the electroconductive film of the present invention have been specifically described. However, the present invention is not limited to the aforementioned embodiments. Needless to say, within a scope that does not depart from the gist of the present invention, modification or alteration can be performed in various ways.

What is claimed is:

1. An electroconductive film installed on a display unit of a display device, comprising:
   one or two or more transparent substrates; and
   two or more wiring layers that are formed on both surfaces of the one transparent substrate or are each formed on one surface of each of the two or more transparent substrates, are disposed in a form of a laminate, and are regularly arranged,
   wherein wiring patterns of the two or more wiring layers are superimposed on a pixel array pattern of the display unit, and a wiring pattern of a wiring layer as a lower layer is disposed at a displaced position in phase relative to a wiring pattern of a wiring layer as an upper layer,
   wherein the two or more wiring layers each have a wiring pattern in a form of mesh in which a plurality of openings are arranged,
   wherein the pixel array pattern comprises a black matrix pattern of the display unit,
   wherein the electroconductive film satisfies:

$$fm1 \leq fm2$$

provided that among spatial frequencies of moire as obtained by convolution of spatial frequency characteristics of the wiring patterns of the two or more wiring layers and spatial frequency characteristics of the pixel array pattern of the display unit, a lowest frequency is set to a first lowest frequency fm1, and among spatial frequencies of moire as obtained by convolution of spatial frequency characteristics of a half of the wiring patterns of the two or more wiring layers and the spatial frequency characteristics of the pixel array pattern of the display unit, a lowest frequency is set to a second lowest frequency fm2,
   wherein the spatial frequency characteristics of the wiring patterns of the two or more wiring layers comprise spatial frequency characteristics in a direction perpendicular to the one or two or more transparent substrates, and
   wherein the spatial frequency characteristics of a half of the wiring patterns of the two or more wiring layers comprise spatial frequency characteristics in a direction inclined by a predetermined angle with respect to the one or two or more transparent substrates.

2. The electroconductive film according to claim 1, wherein the two or more wiring layers are formed on both surfaces of the one transparent substrate.

3. The electroconductive film according to claim 1, wherein the two or more transparent substrates are laminated on each other, the two or more wiring layers being each formed on one surface of each of the two or more transparent substrates.

4. A touch panel, comprising:
   an electroconductive film; and
   a detection control portion configured to detect, within a region where two or more wiring layers are formed, a position at which an object makes a contact with the electroconductive film from outside,
   wherein the electroconductive film installed on a display unit of a display device, includes:
   one or two or more transparent substrates; and
   the two or more wiring layers that are formed on both surfaces of the one transparent substrate or are each formed on one surface of each of the two or more transparent substrates, are disposed in a form of a laminate, and are regularly arranged,
   wherein wiring patterns of the two or more wiring layers are superimposed on a pixel array pattern of the display unit, and a wiring pattern of a wiring layer as a lower layer is disposed at a displaced position in phase relative to a wiring pattern of a wiring layer as an upper layer,
   wherein the two or more wiring layers each have a wiring pattern in a form of mesh in which a plurality of openings are arranged,
   wherein the pixel array pattern comprises a black matrix pattern of the display unit,
   wherein the electroconductive film satisfies:

$$fm1 \leq fm2$$

provided that among spatial frequencies of moire as obtained by convolution of spatial frequency characteristics of the wiring patterns of the two or more wiring layers and spatial frequency characteristics of the pixel array pattern of the display unit, a lowest frequency is set to a first lowest frequency fm1, and among spatial frequencies of moire as obtained by convolution of spatial frequency characteristics of a half of the wiring patterns of the two or more wiring layers and the spatial frequency characteristic of the pixel array pattern of the display unit, a lowest frequency is set to a second lowest frequency fm2, wherein the spatial frequency characteristics of the wiring patterns of the two or more wiring layers comprise spatial frequency characteristics in a direction perpendicular to the one or two or more transparent substrates, and wherein the spatial frequency characteristics of a half of the wiring patterns of the two or more wiring layers comprises spatial frequency characteristics in a direction inclined by a predetermined angle with respect to the one or two or more transparent substrates.

5. A display device, comprising:

a display unit; and an electroconductive film installed on the display unit, wherein the electroconductive film includes:

one or two or more transparent substrates; and two or more wiring layers that are formed on both surfaces of the one transparent substrate or are each formed on one surface of each of the two or more transparent substrates, are disposed in a form of a laminate, and are regularly arranged, wherein wiring patterns of the two or more wiring layers are superimposed on a pixel array pattern of the display unit, and a wiring pattern of a layer as a lower layer is disposed at a displaced position in phase relative to a wiring pattern of a wiring layer as an upper layer, wherein the two or more wiring layers each have a wiring pattern in a form of mesh in which a plurality of openings are arranged, wherein the pixel array pattern comprises a black matrix pattern of the display unit, wherein the electroconductive film satisfies:

$fm1 \leq fm2$ provided that among spatial frequencies of moire as obtained by convolution of spatial frequency characteristics of the wiring patterns of the two or more wiring layers and spatial frequency characterisitics of the pixel array pattern of the display unit, a lowest frequency is set to a first lowest frequency fm1, and among spatial frequencies of moire as obtained by convolution of spatial frequency characteristics of a half of the wiring patterns of the two or more wiring layers and the spatial frequency characteristics of the pixel array pattern of the display unit, a lowest frequency is set to a second lowest frequency fm2, wherein the spatial frequency characteristics of the wiring patterns of the two or more wiring layers comprise spatial frequency characteristics in a direction perpendicular to the one or two or more transparent substrates, and wherein the spatial frequency characteristics of a half of the wiring patterns of the two or more wiring layers comprise spatial frequency characteristics in a direction inclined by a predetermined angle with respect to the one or two or more transparent substrates.

* * * * *